UNITED STATES PATENT OFFICE.

WILHELM HERZBERG AND WALTER BRUCK, OF SCHÖNEBERG, NEAR BERLIN, GERMANY, ASSIGNORS TO ACTIEN GESELLSCHAFT FÜR ANILIN FABRIKATION, OF BERLIN, GERMANY.

ANTHRAQUINONE VAT DYE.

1,050,829.  Specification of Letters Patent.  Patented Jan. 21, 1913.

No Drawing.  Application filed May 8, 1911.  Serial No. 625,760.

*To all whom it may concern:*

Be it known that we, WILHELM HERZBERG and WALTER BRUCK, subjects of the Emperor of Germany, residing at Schöneberg, near Berlin, Germany, our post-office addresses being Landshuterstrasse 24 and Neue Culmstrasse 5ª, Schöneberg, near Berlin, Germany, respectively, have invented certain new and useful Improvements in New Anthraquinone Vat Dyes, of which the following is a specification.

In our application serially numbered 600,111 and filed December 30th, 1910 we have described and claimed brominated anthraquinone acridones. Now we have found that such a brominated anthraquinone acridone if condensed with an aminoanthraquinone or a derivative of an aminoanthraquinone yields very valuable vat dyes which are fast to washing, to chlorin and to light. The tints obtained with these dyes vary from deep brown to red-brown or Corinth. The new dyes produced according to the foregoing invention may also be obtained in a quite different way which is as follows: By condensing a halogenized anthraquinone, and more especially alpha-chloroanthraquinone, with a bromo derivative of anthranilic acid a bromoanthraquinonylanthranilic acid is obtained; now by condensing such a bromo derivative with an aminoanthraquinone or a suitable derivative of an aminoanthraquinone an anthraquinonylaminoanthraquinonylanthranilic acid results which by the action of a suitable condensing agent is converted into the corresponding anthraquinonylaminophenanthraquinone - acridone representing the new vat dyes being the object of our invention.

The following example serves to illustrate our invention, the parts being by weight: 40.5 parts of bromoanthraquinone-acridone, obtained by acting with bromin upon anthraquinonyl-1.2-acridone, and 22.3 parts of alpha-aminoanthraquinone are dissolved in about 700 parts of nitrobenzene and this solution added with 10.6 parts of sodium carbonate and about 1 part of copper powder. The mass is then heated to the boil during about 20 hours, the red solution changing gradually to red-violet. The reaction being finished the mass is distilled with steam in order to eliminate the nitrobenzene, whereby the new vat dye is obtained in the shape of a dark powder which may be purified by extracting it with boiling glacial acetic acid. The new dye is thus obtained in the dry state when pulverized as a dark violet powder which is insoluble in alcohol, benzene, glacial acetic acid, pyridin and chlorobenzene. It dissolves in nitrobenzene to a blue-red solution and in concentrated sulfuric acid to a yellow solution, from which solution on the addition of ice violet flakes are separated. In fuming sulfuric acid containing 25% of $SO_3$ the new dye dissolves to a green solution. By means of a hydrosulfite and an alkali it yields a blue-red vat from which cotton without a mordant is dyed blackish tints which on aging turn to a Corinth shade.

It is obvious to those skilled in the art that our present invention is not limited to the foregoing example or to the details given therein. Thus for instance instead of alpha-aminoanthraquinone employed in the above example beta-aminoanthraquinone may be used: the new dye thus produced yields with an alkaline hydrosulfite solution a violet vat in which cotton is dyed dark violet; by exposure to air the dyeing passes into a fast brown. Furthermore as already mentioned above the new dyes may also be obtained by acting with a bromoanthraquinonylanthranilic acid upon for instance alpha-amino- or beta-aminoanthraquinone and by acting upon the condensation product thus produced with concentrated sulfuric acid; the treatment with sulfuric acid is preferably performed while heating. It is also convenient to state that instead of the sodium carbonate used in the above example as an acid absorbing agent any other suitable substance may be employed. Furthermore for

Having now described our invention and the manner in which it may be performed what we claim is,—

1. As new articles of manufacture, the new vat dyes of the anthraquinone series, being anthraquinonylaminophenanthraquinone-acridones, and the simplest member of this class of dyes possessing the following constitutional formula:

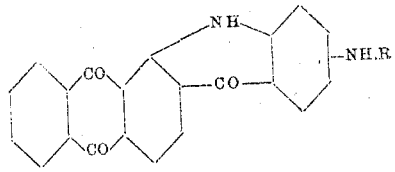

in which formula R represents the residue of an anthraquinone compound, which new dyes yield on cotton from an alkaline hydrosulfite vat deep brown to red-brown or Corinth shades, which are fast to washing to chlorin and to light, and these new dyes being in the dry state when pulverized dark violet to black powders, which are practically insoluble in alcohol, benzene, chlorobenzene, glacial acetic acid and pyridin, and which new dyes dissolve in concentrated sulfuric acid to a yellow to green solution.

2. As a new vat dye the anthraquinone-acridone compound of the following formula:

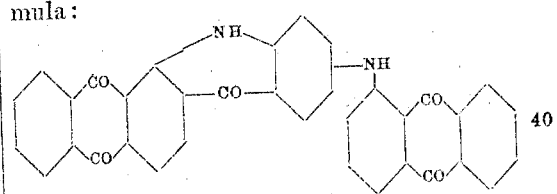

which new dye in the dry state when pulverized forms a dark violet powder which is practically insoluble in alcohol, glacial acetic acid, benzene, chlorobenzene and pyridin, but dissolves in nitrobenzene to a blue-red solution, this new dye dissolving in concentrated sulfuric acid to a yellow solution, from which solution on the addition of ice violet flakes are separated, and which new compound dissolves in fuming sulfuric acid of 25% $SO_3$ to a green solution, this new dye producing on cotton without a mordant from an alkaline hydrosulfite vat a blackish tint which on exposure to air turns to a Corinth shade, which is fast to washing, chlorin and light.

In testimony whereof we have hereunto set our hands in presence of two subscribing witnesses.

WILHELM HERZBERG.
WALTER BRUCK.

Witnesses:
HENRY HASPER,
WOLDEMAR HAUPT.